United States Patent [19]

Kubo et al.

[11] Patent Number: 5,164,457

[45] Date of Patent: Nov. 17, 1992

[54] METHOD FOR HYDROGENATING NITRILE GROUP-CONTAINING UNSATURATED COPOLYMER

[75] Inventors: Yoichiro Kubo; Kazuhiro Takahashi, both of Yokohama, Japan

[73] Assignee: Nippon Zeon Co., Ltd., Tokyo, Japan

[21] Appl. No.: 663,028

[22] Filed: Mar. 1, 1991

[30] Foreign Application Priority Data

Mar. 1, 1990 [JP] Japan .................................. 2-50244

[51] Int. Cl.⁵ .............................................. C08F 8/04
[52] U.S. Cl. ................................. 525/338; 525/329.3; 525/339
[58] Field of Search .............................. 525/338, 339

[56] References Cited

U.S. PATENT DOCUMENTS 4,510,293 4/1985 Kubo et al. ........................ 525/338
4,892,928 1/1990 Hoxmeier ........................... 525/338

Primary Examiner—Bernard Lipman
Attorney, Agent, or Firm—Sherman and Shalloway

[57] ABSTRACT

In a method for hydrogenating a nitrile group-containing unsaturated copolymer which comprises selectively hydrogenating only a carbon-carbon double bond of the nitrile group-containing unsaturated copolymer in solution, the improvement wherein a palladium complex represented by formula $$Pd(Y)_n(X)_m$$

wherein Y denotes at least one neutral ligand, X denotes an anion, n is an integer of 1 to 4 and m is 0, 2 or 4, is used as a hydrogenation catalyst.

2 Claims, No Drawings

METHOD FOR HYDROGENATING NITRILE GROUP-CONTAINING UNSATURATED COPOLYMER

This invention relates to a method for hydrogenating a carbon-carbon double bond of a nitrile group-containing unsaturated copolymer. More specifically, this invention relates to a method wherein a specific palladium complex is used as a hydrogenation catalyst in a reaction of selectively hydrogenating only a carbon-carbon double bond of a nitrile group-containing unsaturated copolymer in solution Various methods have been hitherto proposed as a method in which a highly saturated polymer is obtained by selectively hydrogenating only a carbon-carbon double bond of a nitrile group-containing unsaturated copolymer at a high hydrogenation ratio (e.g. Japanese Laid-open Patent Application Nos. 117501/1984, 17103/1983, 42937/1987, 125858/1987, 1814304/1987, 247706/1986, 45402/1989, 45403/1989, 45404/1989 and 45405/1989).

In general, when using a catalyst comprising a porous carrier and having supported thereon a metal having hydrogenatability, such as cobalt, nickel, ruthenium, rhodium, platinum or palladium, a smaller particle size of the carrier provides higher activity. However, the smaller the particle size the more difficult to separate the catalyst after the reaction. Moreover, since viscosity of a polymer solution is high, reaction efficiency is poor, and a relatively large amount of the catalyst is required to achieve a high hydrogenation ratio. Meanwhile, when using a complex catalyst of rhodium or ruthenium, a complex is unstable in a polar solvent that can dissolve a nitrile group-containing unsaturated copolymer, so that excess ligand has to be added. Accordingly, after the reaction, it is quite difficult to separate the resulting hydrogenated product from the catalyst and the excess ligand.

Moreover, palladium chloride has been so far used as a palladium salt which is soluble or partially soluble in the solvent, and a hydrogenation reaction of a lower-molecular compound using palladium chloride is well known (e.g. U.S. Pat. No. 1,023,753). However, said palladium chloride has almost no activity as a hydrogenation catalyst to a high- molecular compound Accordingly, it is an object of this invention to provide a hydrogenation catalyst which is soluble in a polar solvent, stable in the solvent and good in selectivity in a hydrogenation reaction.

The present inventors have made extensive studies and consequently found that a palladium complex containing a neutral ligand is soluble or partially soluble in a polar solvent, easy to handle and capable of achieving the aforesaid object.

Thus, this invention provides a method for hydrogenating a nitrile group-containing unsaturated copolymer which comprises selectively hydrogenating only a carbon-carbon double bond of the nitrile group-containing unsaturated copolymer in solution, characterized in that a palladium complex represented by formula

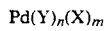

wherein Y denotes at least one neutral ligand, X denotes an anion, n is an integer of 1 to 4 and m is 0, 2 or 4,
is used as a hydrogenation catalyst.

Examples of the neutral ligand constituting the palladium complex used in this invention include olefins such as ethylene, propylene, butene, butadiene and pentadiene; cyclic diene compounds such as cyclopentadiene, cyclooctadiene, cyclodecadiene, cyclododecadiene, norbornadiene and dicyclopentadiene; nitrile compounds such as acetonitrile, propionitrile, allyl cyanide, benzonitrile, cyclohexylisonitrile; diamines such as ethylenediamine, propylenediamine and hexamethylenediamine; pyridines such as pyridine and 2,2'dipyridine; beta-diketones such as acetylacetone and propionylacetone; organic phosphine compounds such as triphenylphosphine and diphenylphosphinoethane; and monosulfides such as dimethyl sulfide, methyl ethyl sulfide and ethyl isobutyl sulfide. Of these, the nitrile compounds are preferable from the aspect of stability.

Examples of the anion are a halogen (fluorine, chlorine, bromine or iodine), boron tetrafluoride and perchloric acid. Of these, chlorine and boron tetrafluoride are preferable from the aspect of solubility.

The complexes comprising the aforesaid neutral ligands and palladium compounds can be obtained as commercial products or produced according to "Shin Jikken Kagaku Kohza (New Experimental Chemistry Course)", No. 8, vol. 12 (published 1976 by Maruzen) or "Chemistry and Application of Noble Metals" (published 1984 by Kodansha Scientific).

Concrete examples of such palladium complexes include dichlorooctadienepalladium, dichloronorbornadienepalladium, tetrakisacetonitrilepalladium tetrafluoroborate, tetrakisberzonitrilepalladium ditetrafluoroborate, dichlorobisacetonitrilepalladium, dichlorobisethylenediaminepalladium, bisacetylacetonatopalladium, tristriphenylphosphineacetonitrilepalladium tetrafluoroborate, dichlorobistriethylphosphinepalladium, dichlorobis(dimethyl sulfide)palladium, dibenzoylsulfidepalladium, bis(2,2'-bipyridine)palladium perchlorate, and tetrakis(pyridine)palladium dichloride.

The amount of the palladium complex used as a catalyst may properly be determined according to an intended hydrogenation ratio. It is usually 2,000 ppm or less, preferably 1,500 ppm or less, calculated as palladium, based on the polymer.

The nitrile group-containing unsaturated copolymer used in this invention is typified by a copolymer of a conjugated diene monomer and an unsaturated nitrile monomer. A copolymer comprising these monomers and a third monomer copolymerizable therewith is also available.

Examples of the conjugated diene monomer include butadiene, isoprene, dimethylbutadiene, 1,3-pentadiene, chloroprene and piperylene. Examples of the unsaturated nitrile monomer include acrylonitrile and methacrylonitrile. Examples of the third copolymerizable monomer include vinyl aromatic hydrocarbons such as styrene, alkylstyrene and divinylbenzene; unsaturated carboxylic acids and their esters such as acrylic acid, methacrylic acid, itaconic acid, maleic acid, methyl acrylate, butyl acrylate, 2-ethylhexyl acrylate, trifluoroethyl acrylate and methyl methacrylate; vinylpyridines; and vinyl esters such as vinyl acetate. The nitrile group-containing unsaturated copolymer may take a form of a random copolymer, a graft copolymer or a block copolymer and may be produced by bulk polymerization, solution polymerization or emulsion polymerization.

Concrete examples of the nitrile group-containing unsaturated copolymer include a butadiene-acrylonitrile copolymer (hereinafter abbreviated as "NBR"), a butadiene-methacrylonitrile copolymer, an isoprene-acrylonitrile copolymer, an acrylonitrile-butadiene-styrene three-component copolymer, a butadiene-butyl acrylate-acrylonitrile three-component copolymer and a butadiene-n-butyl itaconate-acrylonitrile three-component copolymer.

The hydrogenation reaction is performed, when using a copolymer produced by solution polymerization, in solution state as such or, when using a solid copolymer, in such state that the copolymer is dissolved in a solvent. The concentration of the polymer solution is 1 to 70 % by weight, preferably 1 to 40 % by weight.

The solvent is preferably one which dissolves both the catalyst and the polymer, but is not necessarily one which can completely dissolve the catalyst. Examples of the solvent include benzene, toluene, xylene, cyclohexanone, acetone, methyl ethyl ketone, diethyl ketone, tetrahydrofuran and ethyl acetate. The hydrogenation reaction temperature is 5° to 200° C., preferably 10° to 100° C. When it becomes higher than 200° C., the side reaction tends to occur; for example, the solvent is hydrogenated or the nitrile group is hydrogenated at times.

The pressure of hydrogen in the reaction is atmospheric pressure to 150 kg/cm$^2$, preferably atmospheric pressure to 100 kg/cm$^2$. A pressure of higher than 150 kg/cm$^2$ is also available but practically unwanted because a cost of equipment goes high and handling becomes cumbersome.

It is possible that the catalyst used in the hydrogenation reaction can be removed from the reaction solution by adding an ion exchange resin to the reaction solution after reaction to adsorb the catalyst thereto, followed by centrifugal separation and filtration. The catalyst may remain as such in the copolymer without removing it.

The hydrogenated polymer may be separated from the reaction solution by a usual method. Examples thereof are a steam coagulation method in which a polymer solution is directly contacted with steam, a direct drying method in which a polymer solution is dropped on a heating rotary drum to evaporate a solvent or the solvent in the polymer solution is evaporated under reduced pressure and a method in which a polymer solution is precipitated with the addition of a poor solvent. The hydrogenated polymer is thus separated from the reaction solution, subjected to hot air drying, vacuum drying or extrusion drying, and then recovered.

This invention uses the palladium complex having the neutral ligand as a hydrogenation catalyst in the hydrogenation reaction of the nitrile group-containing unsaturated copolymer whereby the nitrile group-containing highly saturated copolymer with only the carbon-carbon double bond of the copolymer selectively highly hydrogenated can be afforded. The resulting copolymer is excellent in weatherability, ozone resistance, heat resistance and cold resistance and can be used in the wide-ranging field.

The following Examples and Comparative Examples illustrate this invention specifically. This invention is however not limited thereto.

| Preparation of Catalysts | |
|---|---|
| [Catalyst 1] | Palladium chloride, PdCl$_2$ Commercial product made by N. E. Chemcat Corp. |
| [Catalyst 2] | Palladium nitrate, Pd(NO$_3$)$_2$ Commercial product made by N. E. Chemcat Corp. |
| [Catalyst 3] | Dichloronorbornadiene palladium PdCl$_2$(NBD) Commercial product made by N. E. Chemcat Corp. |
| [Catalyst 4] | Dichlorobisacetonitrilepalladium PdCl$_2$(CH$_3$CN)$_2$ |

Two grams of palladium chloride is added to 50 ml of acetonitrile and the mixture is reacted at room temperature for 20 minutes. After filtration, yellow crystals are obtained from the filtrate. The amount is 2.7 g (yield 93 %).

| [Catalyst 5] | Dichlorobisbenzonitrilepalladium, PdCl$_2$(C$_6$H$_5$CN)$_2$ |
|---|---|

Two grams of palladium chloride is added to 50 ml of benzonitrile and the mixture is heated at 100° C. for 20 minutes. Filtration is conducted at 40° to 50° C. and the filtrate is poured into 300 ml of petroleum ether to obtain a yellow precipitate. The precipitate is recrystallized with benzene. The amount is 4 g (yield 93%).

| [Catalyst 6] | Tetrakisacetonitrilepalladium ditetrafluoroborate. [Pd(CH$_3$CN)$_4$](BF$_4$)$_2$ |
|---|---|

One gram of palladium metal is dispersed in 250 ml of acetonitrile and 3.3 g of nitrosyl tetrafluoroborate (NOBF$_4$) is added. The mixture is stirred at 0° C. for 30 minutes. Sixty milliliters of dichloromethane is added to precipitate yellow crystals. After the solvent is filtered, the filtrate is washed with dichloromethane. The amount is 3.7 g (yield 80 %).

| [Catalyst 7] | Tristriphenylphosphineacetonitrile-palladium tetrafluoroborate. [Pd(CH$_3$CN)(PPh$_3$)$_3$](BF$_4$)$_2$ |
|---|---|

One gram of palladium metal is dispersed in 250 ml of acetonitrile and 3.3 g of nitrosyl tetrafluoroborate (NOBF$_4$) is added. The mixture is stirred at 0° C. for 30 minutes. Then, a suspension of 25 g of triphenylphosphine in 500 ml of dichloromethane is added. Immediately, green crystals are precipitated. The amount is 9.0 g (yield 94 %).

| [Catalyst 8] | Dichlorobisethylenediaminepalladium, PdCl$_2$(en) |
|---|---|

A uniform solution obtained by adding excess ethylenediamine (en) to an aqueous solution of potassium tetrachloropalladate, K$_2$[PdCl$_4$], is evaporated to obtain colorless crystals. Three grams of the resulting dichlorobisethylene diaminepalladium [Pd(en)$_2$]Cl$_2$ is formed into a saturated aqueous solution. To this is added dropwise a stoichiometric amount of conc. hydrochloric acid to obtain a yellow precipitate. The precipitate is filtered, and the filtrate is washed with water, dilute hydrochloric acid, ethanol and ether in this order, and dried. The amount is 2.1 g (yield 88%).

| [Catalyst 9] | Bisacetylacetonatopalladium, Pd(acac)$_2$ |
|---|---|

To a cold aqueous solution of 2 g of palladium chloride is added 2.2 g (2 molar times) of acetylacetone to obtain a precipitate. The precipitate is reprecipitated with benzene. The amount is 3.2 g (yield 94%).

| [Catalyst 10] | Dichlorobis(dimethyl sulfide)palladium, PdCl$_2$[S(CH$_3$)$_2$]$_2$ |
|---|---|

To an aqueous solution of 2 g of potassium tetrachloropalladate, K$_2$(PdCl$_4$), is added 2 molar times of dimethyl sulfide to precipitate crystals. The amount is 2.1 g (yield 98%).

EXAMPLES 1 to 8

Each of Catalysts 3 to 10 was used as a hydrogenation catalyst in the form of an acetone solution containing 0.1% by weight, calculated as palladium, of the catalyst.

NBR (ML$_{1+4}$50) having the acrylonitrile content of 37% by weight was used as a nitrile group-containing unsaturated copolymer being hydrogenated.

A 100-milliliter autoclave was charged with 5 g of NBR and 45 g of acetone, and the inside of the system was purged with nitrogen. The catalyst was charged therein in an amount of 500 ppm, calculated as palladium, based on the polymer. After replacing the inside of the system with hydrogen thrice at a hydrogen pressure of 10 kg/cm$^2$, the reaction was run at a temperature of 50° C. and a hydrogen pressure of 50 kg/cm$^2$ for 6 hours. After the autoclave was cooled and depressurized, the content was added to a large amount of methanol, coagulated and dried. The iodine value of the resulting sample was measured according to JIS K-0070 to find a hydrogenation ratio. The results are shown in Table 1.

COMPARATIVE EXAMPLES 1 to 2

A neutral ligand-free palladium compound was used as a hydrogenation catalyst. Namely, Catalyst 1 (palladium chloride) or Catalyst 2 (palladium nitrate) was used in the form of an acetone solution as in Examples 1 to 8. The amount of the catalyst used and the reaction conditions were also the same as in Examples 1 to 8. The results of the hydrogenation ratio measured are shown in Table 1.

TABLE 1

|  | Catalyst No. | Palladium compound | Hydrogenation ratio (%) |
|---|---|---|---|
| Comparative Example 1 | 1 | PdCl$_2$ | 5.3 |
| Comparative Example 2 | 2 | Pd(NO$_3$)$_2$ | 6.9 |
| Example 1 | 3 | PdCl$_2$ (NBD) | 45.5 |
| Example 2 | 4 | PdCl$_2$ (CH$_3$CN)$_2$ | 84.9 |
| Example 3 | 5 | PdCl$_2$ (C$_6$H$_5$CN)$_2$ | 82.3 |
| Example 4 | 6 | [Pd (CH$_3$CN)$_4$] (BF$_4$)$_2$ | 71.5 |
| Example 5 | 7 | [Pd (CH$_3$CN)(PPh$_3$)$_3$] (BF$_4$)$_2$ | 41.5 |
| Example 6 | 8 | PdCl$_2$(en) | 57.0 |
| Example 7 | 9 | Pd(acac)$_2$ | 73.2 |
| Example 8 | 10 | PdCl$_2$(S(CH$_3$)$_2$)$_2$ | 43.5 |

From the data in Table 1, it follows that the neutral ligand-containing palladium complex is outstandingly higher in activity as a hydrogenation catalyst than the neutral ligand-free palladium salt. Besides, in Examples 1 to 8, the nitrile group of the acrylonitrile unit in NBR was not hydrogenated at all.

Examples 9 to 10

The hydrogenation reaction of NBR was performed as in Examples 1 to 8 except that Catalysts 4 and 5 were used and the amount of the catalyst was 1,000 ppm, calculated as palladium. The results of the hydrogenation ratio measured are shown in Table 2.

COMPARATIVE EXAMPLES 3 to 4

The hydrogenation reaction was performed as in Examples 9 to 10 except using Catalysts 1 and 2. The results of the hydrogenation ratio measured are shown in Table 2.

TABLE 2

|  | Catalyst No. | Palladium compound | Hydrogenation ratio (%) |
|---|---|---|---|
| Comparative Example 3 | 1 | PdCl$_2$ | 5.8 |
| Comparative Example 4 | 2 | Pd(NO$_3$)$_2$ | 7.3 |
| Example 9 | 4 | PdCl$_2$ (CH$_3$CN)$_2$ | 99 or more |
| Example 10 | 5 | PdCl$_2$ (C$_6$H$_5$CN)$_2$ | 97.1 |

Table 2 reveals that when the amount of the palladium complex catalyst is increased, the high hydrogenation ratio can easily be achieved.

What we claim is:

1. In a method for hydrogenating a nitrile group-containing unsaturated copolymer which comprises selectively hydrogenating only a carbon-carbon double bond of the nitrile group-containing unsaturated copolymer in solution in the presence of a hydrogenation catalyst, the improvement wherein said hydrogenation catalyst consists essentially of a palladium complex represented by formula Pd(Y)$_n$(X)$_m$ wherein Y denotes at least one neutral ligand selected from the group consisting of acetonitrile, benzonitrile, triphenylphosphine, ethylenediamine, acetylacetone, dimethyl sulfide and norbornadiene, X denotes an anion selected from the group consisting of chlorine and boron tetrafluoride, n is an integer of 1 to 4 and m is 0, 2 or 4.

2. The method of claim 1 wherein the nitrile group-containing unsaturated copolymer is an acrylonitrile copolymer.

* * * * *